3,005,821
PHENYLPIPERAZINYLALKYL AMIDES

Shin Hayao, Elkhart, Ind., assignor to Miles Laboratories, Inc., Elkhart, Ind., a corporation of Indiana
No Drawing. Filed Sept. 22, 1958, Ser. No. 762,255
6 Claims. (Cl. 260—268)

This invention relates to new and useful compositions of matter and particularly to phenylpiperazinylalkyl amides which possess sedative activity and are useful in alleviations of nervous tension and anxiety in man.

More specifically, the new compounds may be designated as N-[ω-(1-phenyl or 1-p-substituted phenyl-4-piperazinyl)alkyl]benzamides and represented by the following structural formula:

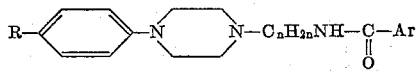

wherein R may be hydrogen or chlorine or a hydroxy or methoxy group, $C_nH_{2n}$ stands for a straight or branched alkylene chain with $n$ being at least 2 and at most 6, and Ar represents phenyl, 4-methoxyphenyl, 3,4-dimethoxyphenyl, 3,4-methylene dioxyphenyl or 3,4,5-trimethoxyphenyl.

The novel compounds of this invention have utility as physiologically active agents; they possess sedative properties similar to those of reserpine being constituted in part of the active portion of the reserpine molecule, namely, the 3,4,5-trimethoxybenzoyl moiety, or of other similar benzoyl moieties, and a 1,4-disubstituted piperazinyl moiety, characterized by its central depressant activity and adrenergic blocking action.

The above defined compounds can be prepared by reacting 1-phenylpiperazine or 1-p-substituted phenylpiperazine with an appropriate (halogenated) alkyl or alkenyl cyanide to produce a 1-phenyl or 1-p-substituted phenyl-4-(ω-cyanoalkyl)piperazine, hydrogenating this nitrile compound to a 1-phenyl or 1-p-substituted phenyl-4-(ω-aminoalkyl)piperazine and reacting this intermediate piperazine with benzoyl chloride or a mono-, di-, or tri-substituted benzoyl chloride to obtain the desired phenylpiperazinylalkyl amide.

The mode of formation may be graphically presented by the following equation:

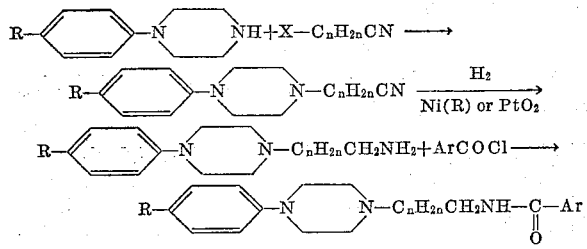

wherein R and Ar have the meanings ascribed to them above, $n$ is an integer from 2 to 6 and X is halogen.

The present compounds may be obtained as free bases having the formula given above or preferably, for pharmacological use, as non-toxic, water-soluble addition salts of halogen acids, sulfuric acid, maleic acid, and the like.

These new compounds and the methods for their preparation may be exemplified more specifically by the following illustrative examples:

EXAMPLE I

N-[3-(1-phenyl-4-piperazinyl)propyl]-3,4,5-trimethoxybenzamide

A. *1-phenyl-4-(2-cyanoethyl)piperazine.*—An equimolar mixture of 1-phenylpiperazine (79 g., 0.5 mole) and acrylonitrile (27 g., 0.5 mole) was heated on a steam bath overnight. It was cooled and triturated with Skelly B to give 101.7 g. (94.5%) of a product melting at 65–70°. A sample was once recrystallized from benzene and Skelly B to give colorless prisms of M.P. 75°. Anal.: Calcd. for $C_{13}H_{17}N_3$: N, 19.5. Found: N, 19.7.

B. *1-phenyl-4-(3-aminopropyl)piperazine.*—The above nitrile (200.9 g., 0.935 mole) was hydrogenated in 500 ml. of methanol saturated with ammonia at 5° in presence of ca. 20 ml. of settled Raney nickel catalyst at 110° under 1350 lb. of hydrogen. The hydrogenation was completed in 2.5 hours and the solvent was removed in vacuo to leave a tan liquid which was distilled to give a colorless liquid of B.P. 139–140° (0.4 mm.), yield 186.1 g. (91%). Anal.: Calcd. for $C_{13}H_{21}N_3$: N (basic), 12.89. Found: N (basic), 12.53.

A sample was dissolved in methanol and treated with dry hydrogen chloride to give a dihydrochloride melting at 253–255° (d.) after one recrystallization from methanol-ethylacetate. Anal.: Calcd. for $C_{13}H_{23}Cl_2N_3$: N, 14.4. Found: N, 14.4.

C. *N-[3-(1-phenyl-4-piperazinyl)propyl]-3,4,5-trimethoxybenzamide.*—1-phenyl-4-(3-aminopropyl)piperazine (6.8 g., 0.031 mole) was dissolved in 100 ml. of ether and added to 50 ml. of 20% sodium hydroxide solution. A solution of 3,4,5-trimethoxybenzoyl chloride (7.2 g., 0.031 mole) in 100 ml. of ether was added dropwise during 10 minutes to the well-stirred mixture cooled in an ice-water bath. A white solid separated. After stirring 2 hours the solid was collected. Yield 9.9 g. (77.5%); M.P. 129.5–130.5°. One recrystallization from aqueous methanol gave fine needles of M.P. 130–131°, wt. 8.9 g. Anal.: Calcd. for $C_{23}H_{31}N_3O_4$: N, 10.2. Found: N, 10.4.

The free base was dissolved in 100 ml. of methanol, treated with dry hydrogen chloride until the solution became acidic and boiled down with ethyl acetate to give crystals of the dihydrochloride methanolate melting at M.P. 192–192.5° (d.) with softening at 171–175° and resolidifying, yield 9.1 g. A sample was dried at 60° (0.1 mm.) for an hour. Anal.: Calcd for $C_{24}H_{37}Cl_2N_3O_5$: N, 8.11. Found: N, 8.06.

A sample was dried at 130° (0.1 mm.) for 3 hours and it melted first and resolidified, M.P. 159–160° (d.). Anal.: Calcd. for $C_{23}H_{33}Cl_2N_3O_4$: N, 8.64. Found: N, 8.97.

PHARMACOLOGY

The acute median lethal dose (A–LD50) of this compound is 490 mg./kg. for oral administration to rats. The acute median convulsive dose (A–CD50) is 100% of the A–LD50 and the acute median hypnotic dose (A–HD50) is 79% of the A–LD50. The acute median sedative dose (A–SD50) is 5.2% and 3.8% after 1 hour and 3 hours respectively, after oral administration. The A–SD99 is 10% after one hour and 6.8% after 3 hours.

A "motor-relaxation" test in which rats are forced to walk a rotating rod turning at 20 r.p.m. demonstrated that at 9% of the A–LD50, one out of five, and at 20%, four out of five rats failed to stay on the "rotarod" one hour after its oral administration. This motor relaxation test (rotarod method—modification of the Kinnard and Carr method—J. Pharmacol. and Exp. Therap., 121:3, 1957) is a technique which measures the amount of coordinated motor activity allowed by various doses of depressant drugs. Scoring is done on a quantal basis, i.e. the number of animals out of five which fall off in the test period of two minutes.

The "convulsive facilitation" test showed that at 9% of the A–LD50 three out of five, and at 20%, four out of five rats had convulsions at a minimum voltage one hour after its oral administration. This test consists in applying a subliminal electric stimulus through alligator clip electrodes to the rats' ears. With this stimulus, normal animals do not exhibit any convulsive response following cessation of stimulation, but after administration of certain drugs effective in the psychoses, the response is facilitated.

This compound is less cumulative than reserpine, having a C-LD50 (chronic median lethal dose) of 55% as compared with reserpine which has a C-LD50 of 5.3%.

EXAMPLE II

*N-[4-(1-phenyl-4-piperazinyl)butyl]-3,4,5-trimethoxybenzamide*

A. *1-phenyl-4-(3-cyanopropyl)piperazine.*—To a solution of 32.4 g. (0.2 mole of the amine in 150 ml. of absolute ethanol and 30 g. (0.28 mole) of anhydrous sodium carbonate was added 31 g. (0.21 mole) of 4-bromobutyronitrile. The reaction mixture was refluxed for 3 hours with stirring, and the filtrate was evaporated in vacuo to leave a tan syrup which was distilled to give a pale yellow liquid of B.P. 171–172° (0.4 mm.), yield 41.1 g. (89.5%). Anal.: Calcd. for $C_{14}H_{19}N_3$: N, (basic), 6.11. Found: N (basic), 6.09.

B. *1-phenyl-4-(4-aminobutyl)piperazine.*—The above nitrile (0.18 mole) was hydrogenated in methanol saturated with liquid ammonia (50:50) in the presence of ca. 5 ml. of Raney nickel catalyst. The hydrogenation was completed in 1.5 hours at 100° under 1000 lbs. of hydrogen. The catalyst was filtered off and the residue was distilled to give a colorless liquid of B.P. 146–147° (0.3 mm.); yield 30.9 g. (73.5%). Anal.: Calcd. for $C_{14}H_{23}N_3$: N (basic), 12.02. Found: N (basic), 11.72.

C. *N-[4-(1-phenyl - 4 - piperazinyl)butyl] - 3,4,5 - trimethoxybenzamide.*—To a vigorously stirred solution of 1-phenyl-4-(4-aminobutyl)piperazine (30.5 g., 0.131 mole) in a mixture of benzene and ether (200 ml., 1:1) in the presence of 50 ml. of 20% aqueous sodium hydroxide there was added a solution of 3,4,5-trimethoxybenzoyl chloride (30.5 g., 0.132 mole) in 100 ml. of benzene during 15 minutes to separate a white solid. The reaction mixture was stirred at room temperature overnight and the white solid was collected by suction. Yield 55.4 g., (99%) after drying at 50° in an oven. Ten grams of the amide was once recrystallized from aqueous methanol to give colorless needles of M.P. 153–154°, yield 9.4 g. Anal.: Calcd. for $C_{24}H_{33}N_3O_4$: N, 9.83. Found: N, 9.71.

The crude amide (45.3 g.) was dissolved in 450 ml. of methanol and treated with dry hydrogen chloride until the solution became strongly acidic. The solution was boiled down with ethyl acetate to separate colorless crystals of the dihydrochloride which melted at 243–244° (d.); yield 42.0 g. Anal.: Calcd. for $C_{24}H_{35}Cl_2N_3O_4$: HCl, 14.6. Found: HCl, 14.3.

In accordance with methods described above, the compounds given below together with their physical constants, were also manufactured.

EXAMPLE III

*N - [3 - (1 - p - chlorophenyl - 4 - piperazinyl)propyl]-3,4,5-trimethoxybenzamide.*—M.P. 178–180° d. Anal.: Calcd. for $C_{24}H_{36}Cl_3N_3O_5$ (the dihydrochloride methanolate): N (basic), 7.60; HCl, 13.2. Found: N (basic), 7.55; HCl, 12.9.

EXAMPLE IV

*N - [2 - (1 - phenyl - 4 - piperazinyl)ethyl] - 3,4,5 - trimethoxybenzamide.*—M.P. 215–216° d. Anal.: Calcd. for $C_{22}H_{31}Cl_2N_3O_4$ (the dihydrochloride): HCl, 15.5. Found: HCl, 15.2.

EXAMPLE V

*N - [5 - (1 - phenyl - 4 - piperazinyl)amyl] - 3,4,5 - trimethoxybenzamide.*—M.P. 166–168° d. Anal.: Calcd. for $C_{25}H_{37}Cl_2N_3O_4$ (the dihydrochloride): HCl, 14.2. Found: HCl, 14.3.

EXAMPLE VI

*N - [4 - (1 - p - chlorophenyl - 4 - piperazinyl)butyl]-3,4,5-trimethoxybenzamide.*—M.P. 176–176.5° d. Anal.: Calcd. for $C_{24}H_{34}Cl_3N_3O_4$ (the dihydrochloride): HCl, 13.7. Found: HCl, 13.7.

EXAMPLE VII

*N - [3 - (1 - p - methoxyphenyl - 4 - piperazinyl)propyl] - 3,4,5 - trimethoxybenzamide.*—M.P. 202–204° d. Anal.: Calcd. for $C_{24}H_{35}Cl_2N_3O_5$ (the dihydrochloride): HCl, 14.15. Found: HCl, 14.04.

Pharmaceutical compositions which have utility as sedative materials are conveniently and easily produced by combining a compound of the class hereinbefore described with fillers, carriers, extenders and/or excipients, such as are generally used in the preparation of pharmaceutical products which are to be taken orally or given parenterally, especially for human use. The compounds may be used in the form of the free base or of the salts of acids which are water-soluble and non-toxic, such as the hydrochloride, hydrobromide, sulfate and the like. The compositions may be either in solid or liquid state and may be compounded as tablets, powders, capsules, suspensions and similar dosage forms, particularly useful for oral ingestion. In such form the composition may be prepared by mixing the foregoing compounds either in the form of a free base or the water-soluble non-toxic salts, with such common diluents or tabletting adjuncts as cellulose powder, cornstarch, lactose, talc, stearic acid, magnesium stearate, gums and the like, in accordance with conventional manufacturing practices common in the art.

Where the product is to be administered parenterally, the compounds, preferably in the form of their non-toxic water-soluble salts, may be associated with such carriers as water, saline solution, glucose solution and the like.

We have found that for oral administration a suitable dosage unit is from about 50 to 300 milligrams of the compound per tablet, capsule or other dosage form. Where the material is to be administered parenterally, then a suitable dosage unit would be from about 35 to 300 milligrams of the active ingredient.

Dosages as above described may be administered as frequently as conditions demand, and it is understood, of course, that for children the dosages are correspondingly smaller, depending upon the age and weight of the child, as those skilled in the art will appreciate.

The following examples will illustrate in detail typical procedures for preparing a number of representative dosage unit forms of our compositions in accordance with this invention.

EXAMPLE VIII

A pharmaceutical composition having the following formulation was prepared:

| | Mg. |
|---|---|
| N-[3-(1-phenyl - 4 - piperazinyl)propyl] - 3,4,5-trimethoxybenzamide | 50.0 |
| Lactose | 200.0 |
| Magnesium stearate | 5.0 |

The piperazinylalkyl benzamide is mixed with the lactose and thoroughly wetted with water. The wetted material is then pressed through a sieve of the desired size and dried in an oven at about 140° F. When dry, the magnesium stearate is added and the composition is dry-mixed thoroughly. The mixed material is then compressed into tablets.

It will be understood that the above example is only representative of one specific form of this invention. Other excipients such as sucrose, sodium chloride, kaolin, dicalcium phosphate and the like may be used. The excipient may be present in amounts varying from about 30 to 300 parts by weight, depending upon the final formulation. Instead of magnesium stearate as the lubricant, stearic acid, boric acid, and the like are operable.

For best results from about 2 to 10 parts by weight of the lubricant is used. It will be understood that any of the piperazinylalkyl benzamides described above may be used as the active ingredient of the composition. Depending on the dosage unit desired, from 30 to 300 parts of the desired compound will be used.

EXAMPLE IX

For capsules the following formulation was used:

| | Mg. |
|---|---|
| N-[3-(1-phenyl-4-piperazinyl)propyl] - 3,4,5 - trimethoxybenzamide | 500.0 |
| Lactose | 1000.0 |
| Talc | 75.0 |

This material was prepared as described in Example IV above, that is, the piperazinylalkyl benzamide and the lactose were wetted, sieved, dried, and mixed with the talc. Capsules each containing 50 mg. of the active ingredient were prepared.

In summary, the present invention relates to N-[ω-(phenyl-4-piperazinyl)alkyl] amides which have sedative properties, and to methods of using the same.

Formation of the subject compounds is effected as follows: reacting 1-phenylpiperazine with an (halogenated) alkyl or alkenyl cyanide, hydrogenating the cyanoalkylpiperazine and reacting the resulting aminoalkylpiperazine with benzoyl chloride or a mono-, di-, or tri-substituted benzoyl chloride.

For pharmaceutical use the compounds of the present invention may be compounded as tablets, powders, capsules, etc. for oral ingestion, admixed with such common diluents as cornstarch, lactose, talc, etc. or they may be used together with such carriers as saline or glucose solutions where to be given parenterally. Suitable dosage units are from about 50 to 300 mg. of the compound per tablet or other dosage form for oral administration and from about 25 to 300 mg. for parenteral administration.

What is claimed is:

1. A new composition of matter selected from the group consisting of phenylpiperazinylalkyl amides represented by the formula:

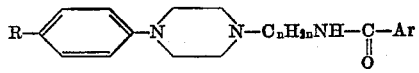

wherein R is a member of the group consisting of hydrogen atoms, chlorine atoms and methoxy radicals, $C_nH_{2n}$ is an alkylene chain in which $n$ is a number taken from the group consisting of 2,3,4,5 and 6 and Ar is 3,4,5-trimethoxyphenyl; and non-toxic water-soluble acid addition salts thereof having therapeutically acceptable anions.

2. N-[3-(1-phenyl - 4 - piperazinyl)propyl] - 3,4,5-trimethoxybenzamide.

3. N-[4-(1-phenyl-4-piperazinyl)butyl] - 3,4,5-trimethoxybenzamide.

4. N-[5-(1-phenyl-4-piperazinyl)amyl] - 3,4,5-trimethoxybenzamide.

5. N-[3-(1-p-methoxyphenyl - 4 - piperazinyl)propyl]-3,4,5-trimethoxybenzamide.

6. N-[4-(1-p-chlorophenyl-4-piperazinyl)butyl] - 3,4,5-trimethoxybenzamide.

References Cited in the file of this patent

UNITED STATES PATENTS

| 2,722,529 | Fleming et al. | Nov. 1, 1955 |
| 2,870,145 | Perron | Jan. 20, 1959 |

FOREIGN PATENTS

| 162,905 | Australia | May 17, 1955 |

OTHER REFERENCES

Goodwin et al.: The Pharmaceutical Journal, vol. 181, pp. 233–235, September 1958.
Laurence et al.: British Medical Journal, pp. 700–702 (1958).
British Med. J., pp. 938–939, April 19, 1958.
Keele: The Lancet, pp. 243–246, Jan. 31, 1959.